United States Patent [19]
Jagielinski

[11] Patent Number: 5,218,498
[45] Date of Patent: Jun. 8, 1993

[54] COMPOSITE READ-WHILE-WRITE MAGNETIC HEAD ASSEMBLY

[75] Inventor: Tomasz M. Jagielinski, Carlsbad, Calif.

[73] Assignee: Eastman Kodak Company, Rochester, N.Y.

[21] Appl. No.: 718,462

[22] Filed: Jun. 20, 1991

[51] Int. Cl.5 .................. G11B 5/127; G11B 5/265
[52] U.S. Cl. ........................... 360/113; 360/121
[58] Field of Search .................. 360/113, 121, 126

[56] References Cited
U.S. PATENT DOCUMENTS 5,027,245 6/1991 Nagata ........................ 360/121
5,068,760 11/1991 Kira ........................... 360/121

Primary Examiner—A. J. Heinz
Attorney, Agent, or Firm—William W. Holloway

[57] ABSTRACT

A composite read-while-write magnetic head assembly includes a substrate having first and second opposing planar surfaces. An inductive record head of the thin film type is situated on the first planar surface, and a playback head of the magnetoresistive (MR) type is located on the second planar surface, in alignment with the record head. With an MR playback head and a thin film record head, the alignment between the two heads is limited by the precision of a photolithographic process, which is very accurate relative to the width of even the most narrow record track. Furthermore, the substrate is selected to be of sufficient thickness to isolate the MR playback head from the effects of fields created by the inductive record head, thereby eliminating crosstalk between the two heads.

8 Claims, 2 Drawing Sheets

COMPOSITE READ-WHILE-WRITE MAGNETIC HEAD ASSEMBLY

BACKGROUND OF THE INVENTION

1. Field of the Invention

This invention relates to read-while-write magnetic recording apparatus. More specifically, the invention relates to a magnetic head assembly for read-while-write recording apparatus.

2. Description Relative to the Prior Art

In a magnetic recording apparatus, either tape or disk, a read-while-write capability is an essential feature for providing error free magnetically stored data. A read-while-write head assembly comprises a record head in-line with a playback head, with the read head closely positioned downstream of the record head in the direction of media motion. By continually reading "just recorded" data while writing, the integrity or quality of the recorded data is immediately determined at a time while the original data is still available in temporary storage in the recording system. If data contained within a certain data block cannot be successfully read, the entire data block is re-recorded at a different location on the media, and a flag is set to inform the playback electronics that the previous recorded version of the data block is incorrect and should be ignored.

When reading-while-writing data, a signal radiated from the record head and electronics to the playback head and electronics, referred to hereinafter as crosstalk, can cause excessive amounts of noise. Crosstalk during a read-while-write operation of magnetic recording apparatus can be, for example, the result of propagation of electric and magnetic fields from sources such as the coil of the record head and leads between the coil and recording electronics.

It is understood by those skilled in the art that read-while-write capability in magnetic recording apparatus imposes stringent geometry and spatial considerations for reading "just recorded" data. Direct crosstalk between the "paired" heads can be overcome by providing for a greater separation therebetween. However, a larger spacing introduces a larger delay between the time data is recorded and when that data is played back, thereby requiring a larger temporary storage for original data. Furthermore, a larger spacing increases the possibility that there will be misalignment between the two heads, thereby introducing a tracking error. This problem can be very severe for a high-density recorder having narrow recording tracks.

A solution to the misalignment problem is an integrated read-write head. The disclosure of U.S. Pat. No. 3,908,194 is exemplary of an integrated read-while-write head assembly having an inductive record - MR playback head combined on the same surface of a substrate. In an attempt to overcome the problem of direct crosstalk between the record and playback heads, the integrated head employs various shielding layers to isolate the MR element of the playback head from fields of the inductive record head. This solution, however, contributes significantly to the complexity of the combined head, thereby adding to manufacturing cost, increasing assembly time, and reducing manufacturing yield. Furthermore, in order to fit into the limited space of a read-while-write head assembly, gaps must often be left in a shield for such things as wires or ventilation. Gaps or discontinuities present in a shield reduce shielding effectiveness.

SUMMARY OF THE INVENTION

In view of the foregoing, an object of the present invention is to provide a read-while-write magnetic head assembly of simple design that is free of crosstalk with insignificant tracking error between the record head and the playback head.

In its broadest sense, a read-while-write magnetic head assembly, in accordance with the invention, comprises a unitary substrate having first and second opposing planar surfaces. An inductive record head of the thin film type, which, of course, is defined by a photolithographic process, is situated on the first planar surface of the substrate, and a playback head, also defined by a photolithographic process, is located on the second planar surface of the substrate, in alignment with the record head. The substrate is selected to be of sufficient thickness to isolate the playback head from the effects of fields created by the inductive record head, thereby eliminating crosstalk between the two heads.

The playback head can be of the magnetoresistive (MR) type or it can be an inductive head of the thin film type. For a given separation between the record and playback heads, direct crosstalk between an MR playback head and an inductive head is much smaller than if both heads are inductive. Accordingly, a playback head of the MR type is preferred to reduce the delay between when data is recorded and played back.

With a playback head, either thin film or MR, and a thin film record head deposited on opposite sides of the same substrate, the alignment between the two heads is limited by the precision of a photolithographic process. Since a photolithographic process is very accurate relative to the width of even the most narrow track, tracking error between the two heads is effectively eliminated.

In an alternative preferred embodiment, a bi-directional multitrack read-while-write head assembly comprises a first series of inductive record heads of the thin film type and a first series of playback heads of the MR type situated on one planar surface of a unitary nonmagnetic substrate. A second corresponding series of thin film record heads and a second corresponding series of MR playback heads are located on the opposing planar surface of the substrate. The substrate is of a thickness that is sufficient to isolate (1) the second series of MR playback heads from the effects of fields created by the first series of thin film record heads, and (2) the first series of MR playback heads from the effects of fields created by the second series of thin film record heads. With this arrangement, when a magnetic tape is moved past the magnetic head assembly (1) in a first direction, the second series of playback heads reads, free of direct crosstalk, signals written by the first series of record heads, and (2) in a second direction, the first series of playback heads reads crosstalk-free signals written by the second series of record heads.

These advantages, as well as other advantages, will become more apparent in the detailed description of preferred embodiments presented below.

BRIEF DESCRIPTION OF THE DRAWINGS

The invention will be described with reference to the accompanying drawings, wherein: read-while-write head assembly in accordance with the present invention.

DETAILED DESCRIPTION OF PREFERRED EMBODIMENTS

Figure 1:
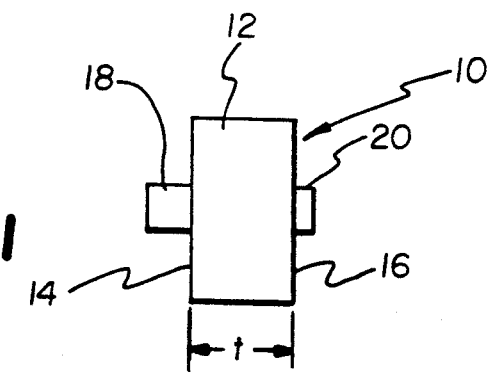

An object of the invention is to provide a read-while-write magnetic head assembly of simple design that is free of crosstalk with insignificant tracking error between a record head and a playback head of the assembly. This object is achieved by means of a composite read-while-write magnetic head assembly 10 shown in simplified form in the top plan view of FIG. 1.

The composite head assembly 10 comprises a unitary substrate 12 having opposing planar surfaces 14 and 16. An inductive recording head 18 of the thin film type, defined by a photolithographic process on the surface 14, serves for writing information on a recording medium (not shown) such as a magnetic tape or a magnetic disk. A playback head 20 formed by photolithographic process on the surface 16 in alignment with the record head 18, serves for reading information immediately after it is written by the record head.

A composite read-while-write head assembly having both heads defined by a photolithographic process, in accordance with the invention, offers an advantage in that the alignment between the playback head and the record head is limited by the precision of each photolithographic process. With a photolithographic process for both heads, there is essentially no problem with maintaining precise alignment between the two heads, even for a record track of extremely narrow width.

A further feature of the magnetic head assembly 10 is that the width or thickness, t, of the substrate 12 is sufficient in itself to isolate the playback head 20 during a reading operation from the effects of fields created by the record head 18 during a contemporaneous writing operation. In other words, the substrate 12 is sufficient to prevent direct crosstalk between the record head 18 and the playback head 20. To that end, a playback head of the magnetoresistive (MR) type is preferred to a thin film playback head because, for a given separation, direct crosstalk between an MR playback head and an inductive write head is much smaller than if both heads are inductive. An MR playback head offers a further advantage because its sensitivity is greater than an inductive playback head.

Figure 2:
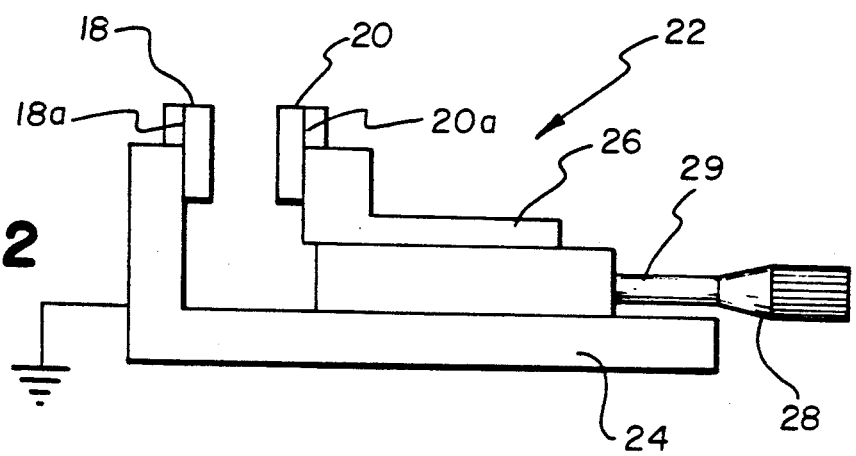
FIG. 2 shows a test fixture for measuring direct crosstalk between a record head and a playback head as a function of the separation therebetween.

FIG. 2 shows a shieldless test fixture 22 for varying the gap-to-gap separation between the record head 18 and the playback head 20, to determine the width of the substrate that is necessary to suppress direct crosstalk between the two heads. For that purpose, the record head 18, having a gap 18a, is mounted in a stationary position on an L-shaped aluminum block 24, as shown. The reproduce head 20, with a gap denoted 20a, is secured to a block 26, which is mounted for precision slidable movement relative to the record head 18. For that purpose, a micrometer 28, having an adjustable output 29 coupled to the block 26, serves to vary the gap-to-gap spacing of the two heads.

Figure 3:
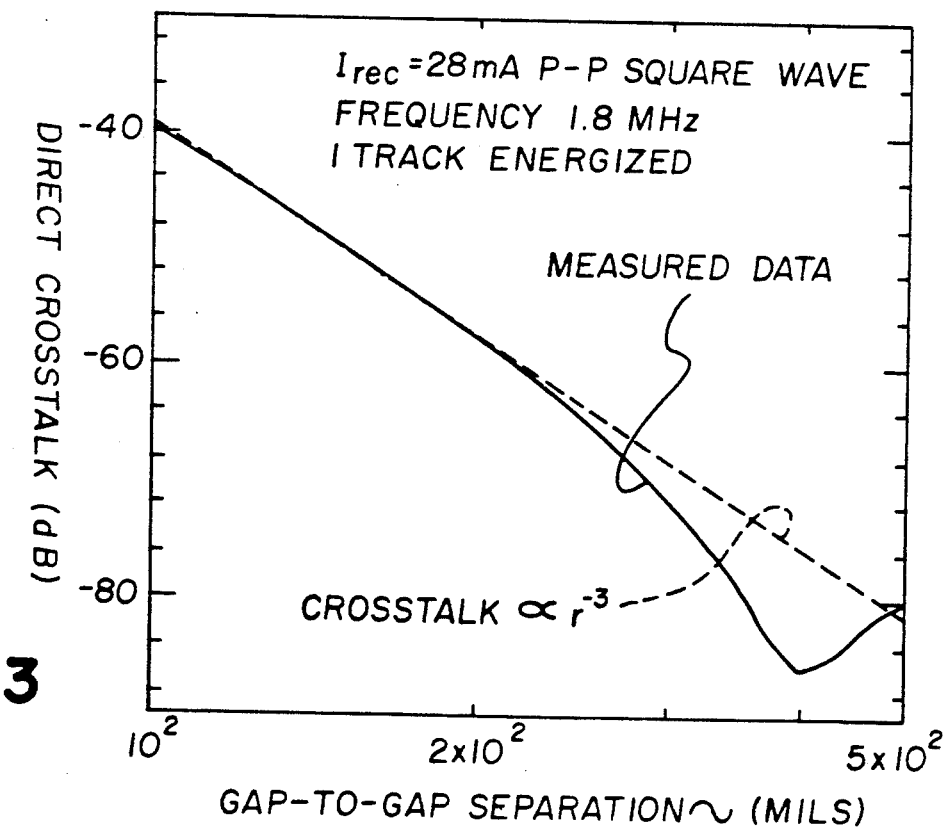
FIG. 3 is a graph showing direct crosstalk between an inductive record head and an inductive write head as a function of the separation therebetween.

FIG. 3 shows the crosstalk between an inductive thin film record head and an inductive playback head as a function of their gap-to-gap separation. Crosstalk measurements were made using a 28 milliamp (mA) peak-to-peak square wave record current, at a frequency of 1.8 MHz, with the leads (not shown) between the record and playback heads and their respective electronics (also not shown) well separated.

The dashed line of FIG. 3 has a slope of $-3$, and thereby shows that for separations up to about 230 mils, crosstalk decreases as the cube of the distance, r, separating the respective gaps of the two inductive heads. The main source of crosstalk at these distances is the magnetic field generated by the coil of the record head 18. That field causes flux to pass through the coil of the inductive playback head 20. For distances greater than about 400 mils, the slope of the solid line changes abruptly from increasing negatively to positive. This increase in crosstalk is believed to be due to interference between the crosstalk produced by the field from the coil of the record head and other sources of crosstalk, such as that from leads and electronics.

The data of FIG. 3 were obtained with only a single record head energized. In a multitrack recorder, multiple record heads are commonly operated simultaneously. Because of this, crosstalk from all record heads to any one playback head may be better or worse depending on the situation. This is because both constructive and destructive interference may occur between the fields emitted by multiple record heads. If two tracks have signals of the same frequency with the same phase, then direct crosstalk will be greater than the crosstalk noise with only one record head energized. On the other hand, if the drive currents for two record heads are 180° out of phase with each other, then crosstalk will tend to cancel out.

Crosstalk between a thin film inductive write head and a shieldless MR playback head was measured under the same conditions, i.e., a 28 mA peak-to-peak square wave record current, at 1.8 MHz. Unlike the inductive-to-inductive case, significant direct crosstalk in the inductive-to-MR case was found to occur only when both heads are separated less than 100 μm. This is not to say that other sources of crosstalk may not cause a problem. For example, if the leads of the inductive record head and the MR playback head are close together, than crosstalk increases substantially.

Many modern tape systems require writing and reading of data for either direction of tape travel. The streaming tape system where the recording is laid down on the tape in a serpentine pattern for alternate directions of tape travel is an example of such a bi-directional recording system. Incorporation of read-while-writing capability for bi-directional operation necessitates a head assembly consisting of a first pair of write-read heads when tape is advancing in a first direction and a second pair of write-read heads when tape is moving in the opposite direction.

Figure 4:
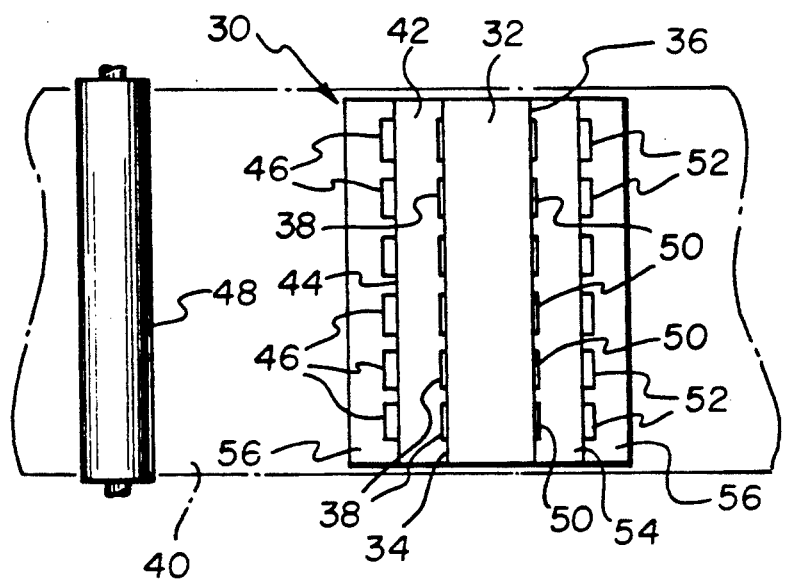
FIGS. 4, 5 and 6 are top plan views of various embodiments of a multitrack bi-directional read-while-write head assembly in accordance with the present invention.

FIG. 4 shows a presently preferred embodiment of a multitrack bi-directional read-while-write magnetic head assembly 30 in accordance with the present invention. The head assembly 30 comprises a unitary substrate 32 having opposing planar surfaces 34 and 36. A series of playback heads 38 of the MR type, deposited in side-by-side relationship on the surface 34, serves for reading information from corresponding record tracks on a magnetic tape 40, shown in phantom. A passivation layer 42 of good wear characteristics, preferably a ceramic comprising aluminum oxide (Al$_2$O$_3$), silicon dioxide (SiO$_2$), or zirconium oxide (ZrO$_2$), functions to provide a planar surface for subsequent processing.

To that end, the top surface 44 of the passivation layer 42 is lapped to a planar finish for the purpose of depositing a series of inductive record heads 46 of the thin film type in alignment with corresponding playback heads 38. Each head 46 functions for writing information on the magnetic tape 40 when it is driven from left to right, as viewed in the drawing, under the influence of a bi-directional capstan 48.

The separation between the series of inductive record heads 46 and the series of MR playback heads 38 is about 10 to 30 μm. This distance is too small to prevent significant crosstalk between a record head 46 and the underlying playback head 38 if both were operative during a read-while operation. Accordingly, the series of playback heads 38 serve for reading information on the tape 40 when it is transported in the opposite direction, i.e. from right to left, under the influence of the capstan 48.

For the purpose of reading information immediately after it is written by the record heads 46, a series of playback heads 50 of the MR type is situated on the opposing planar surface 36 in alignment with the record heads 46. Similarly, for the purpose of writing information immediately prior to it being read by the playback heads 38, a series of inductive thin film record heads 52 is located in alignment with the playback heads 38. To that end, the record heads 52 are deposited on a planar passivation layer 54 of Al$_2$O$_3$, SiO$_2$ or ZrO$_2$ encapsulating the playback heads 50. Preferably, the record heads 46, 52 on opposing sides of the substrate 32 are also covered by a similar passivation layer, denoted 56.

U.S. Pat. No. 3,887,945, the disclosure of which is incorporated herein by reference, is exemplary of a read-while-write head assembly having inductive and magnetoresistive elements, defined by a photolithographic process, on the same surface of a substrate.

Like the head assembly 10 of FIG. 1, corresponding pairs of record/playback heads of the head assembly 30 of FIG. 4 are separated sufficiently so that the fields created by each record head have no affect on the operation of each playback head. Also, with corresponding pairs of MR playback heads and thin film record heads deposited on opposite sides of the same substrate, the alignment between corresponding write-read heads is again limited solely by the precision of the photolithographic process.

Figure 5:
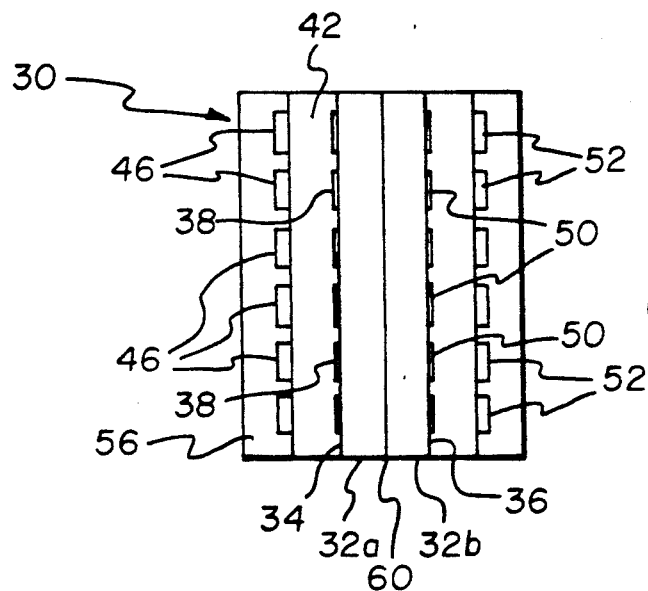

FIG. 5 shows an alternative preferred embodiment of a multitrack bi-directional read-while-write head assembly 30 in accordance with the invention. (Elements of FIG. 5 that are structurally or functionally the same as or equivalent to elements of FIG. 4 are identified by like numerals.) The embodiment of FIG. 5, like the embodiment of FIG. 4, includes a series of MR playback heads 38 integrated with a series of thin film record heads 46 on a planar surface 34. Additionally, the playback heads 38 and the heads 46 are encapsulated in respective planar passivation layers 42 and 56.

Similarly, MR playback heads 50 and thin film record heads 52 are deposited in alignment with each other on an opposing planar surface 36 of the underlying substrate. The head assembly 30 of FIG. 5, however, differs from the read-while-write head assembly of FIG. 4 in that the underlying substrate 32 of FIG. 5 is comprised of two substrates, denoted 32a, 32b, joined together at a common interface 60 by suitable adhesive means, such as glue, epoxy, cement, or the like. The total thickness of the combined substrate is, however, sufficient to isolate fields produced by record heads on one side of the combined substrate from the MR playback heads on the opposite side of the combined substrate.

Accordingly, similar to the operation of the embodiment of FIG. 4, when tape (not shown) is moved in one direction, the MR heads on one side of the combined substrates 32a, 32b read information written contemporaneously by corresponding thin film heads deposited on the opposite side of the combined substrate; in the opposite direction of tape transport, the other corresponding pair of record/playback (write/read) heads perform the read-while-write operation. In the embodiment of FIG. 5, the alignment between corresponding write/read heads depends on the mechanical alignment between the substrates 32a, 32b.

Figure 6:
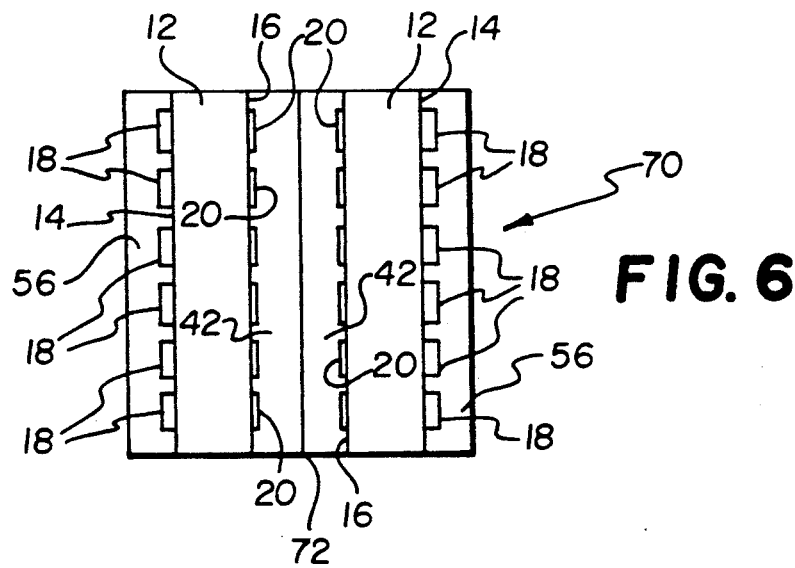

A further embodiment of a multitrack bi-directional read-while-write head assembly 70 is shown in FIG. 6. (Elements of FIG. 6 that are structurally or functionally the same as or equivalent to elements of FIG. 1 are identified by like numerals.)

The head assembly 70 of FIG. 6 is comprised of two separate substrates 12 each of which has opposing planar surfaces 14 and 16. Each substrate 12 also includes a series of deposited thin film record heads 18 arranged side-by-side on the planar surface 14. Similarly, a corresponding plurality of MR playback heads 20 are arranged side-by-side on the planar surface 16 of each substrate 12. As shown, the two series of playback heads 20 are in alignment with each other and with each series of record heads 18. Like the embodiments of FIGS. 4 and 5, each series of MR playback heads and each series of thin film record heads are covered by a planar passivating layer 42 of Al$_2$O$_3$, SiO$_2$ or ZrO$_2$. The two substrates 12 are coupled by suitable adhesive means at an interface 72 common to the planar surface of each passivating layer 42. Like the embodiment of FIG. 4, each substrate 12 has a thickness sufficient to isolate the MR heads 20 from fields created by the record heads 18 during a read-while-write operation.

In operation, when tape (not shown) is moved from left to right, as viewed in the drawing, the series of inductive record heads 18 deposited on the "left-hand" substrate 12 serves for writing information on respective tracks of the tape; conversely, the record heads 18 on the other substrate write information when tape is driven in the opposite direction. Because the MR playback heads 20 are isolated from the fields of the record heads 18, either series of MR playback heads can serve for reading recorded information. As disclosed previously herein, the alignment between corresponding pairs of record/playback heads deposited on the same substrate 12 is limited by the precision of the photolithographic process; however, the alignment between corresponding record/playback heads deposited on different substrates 12 is limited by the mechanical alignment between the two substrates. Because a photolithographic process is generally more precise than a mechanical alignment, a preferred manner of operating the head assembly 70 of FIG. 6 is to have the MR heads and the thin film heads deposited on the same substrate perform a given read-while-write operation. In other words, the record/playback heads deposited on the left-hand substrate 12 operate when tape is driven from left to right and the heads deposited on the other substrate 12 cooperatively operate when tape is driven in the opposite direction.

The invention has been described in detail with reference to the figures; however, it will be appreciated that variations and modifications are possible within the spirit and scope of the invention.

What is claimed is:

1. A composite read-while-write magnetic head assembly comprising:
   a) a unitary substrate having first and econd opposing planar surfaces;
   b) an inductive record head, defined by a photolithographic process, in proximity to said first planar surface of said substrate; and
   c) a playback head, defined by a photolithographic process, in proximity to said second planar surface of said substrate in alignment with said record head;
   d) said substrate being sufficiently thick to isolate said playback head from the effects of fields created by said inductive record head.

2. In magnetic tape read-while-write apparatus comprising a record head and a playback head, and means for transporting magnetic tape past said record head then immediately past said playback head, the improvement comprising:
   a) a unitary substrate having first and second opposing planar surfaces oriented transverse to advancing magnetic tape;
   b) said record head being of the inductive thin film type situated in proximity to said first planar surface of said substrate; and
   c) said playback head being of the magnetoresistive type situated in proximity to said second planar surface of said substrate in alignment with said record head;
   d) said substrate having a sufficient thickness the effect of which is to magnetically isolate said magnetoresistive playback head from fields created by said inductive record head.

3. A composite bi-directional read-while-write magnetic head assembly comprising:
   a) a unitary substrate having first and second opposing planar surfaces;
   b) a first inductive record head and a first playback head, both of which are defined by a photolithographic process, one of which is situated in proximity to said first planar surface of said substrate and the other of which overlays said one, both in alignment with each other;
   c) a second inductive record head and a second playback head, both of which are defined by a photolithographic process, one of which is situated in proximity to said second planar surface of said substrate and the other of which overlays said one, both in alignment with each other and with said first record head and said first playback head;
   d) said substrate being sufficiently thick to isolate (1) said second playback head from the effects of fields created by said first inductive record head, and (2) said first playback head from the effects of fields created by said second inductive record head.

4. In bi-directional read-while-write apparatus comprising a magnetic head assembly including first and second inductive record heads and first and second playback heads, and means for transporting a magnetic tape past said magnetic head assembly (1) in a first direction wherein said second playback head reads signals written by said first record head, and (2) in a second direction wherein said first playback head reads signals written by said second record head, the improvement comprising:
   a) a unitary substrate having first and second opposign planar surfaces oriented transverse to advancing magnetic tape;
   b) said first inductive record head being of the thin film type and said first playback head being of the magnetoresistive type, one of which is situated in proximity to said first planar surface of said substrate and the other of which overlays said one, both in alignment with each other;
   c) said second inductive record head being of the thin film type and said second playback head being of the magnetoresistive type, one of which is situated in proximity to said second planar surface of said substrate and the other of which overlays said one, both in alignment with each other and with said first srecord head and said first playback head;
   d) said substrate being sufficiently thick to isolate (1) said second magnetoresistive playback head from the effects of fields created by said first inductive record head, and (2) said first magnetoresistive playback head from the effects of fields created by said second inductive record head.

5. Bi-directional read-while-write apparatus as defined in claim 4 wherien said first magnetoresistive playback head is deposited directly on said first planar surface head overlays said first playback head, and said second magnetoresistive playback head is deposited directly on said second planar surface of said substrate and said second inductive record head overlays said second playback head, wherein said substrate and said first and said second playback heads are disposed between said first and said second record heads.

6. In bi-directional multitrack read-while-write magnetic recording apparatus comprisign a multitrack magnetic head assembly including a first series and a second series of inductive record heads and corresponding first and second series of playback heads, and means for transporting a magnetic tape past said magnetic head assembly (1) in a first direction wherein said second series of playback heads reads signals written contemporaneously by said first series of record heads, and (2) in a second direction wherein said first series of playback heads reads signals written contemporaneously by said second series of record heads, the improvement comprising:
   a) a unitary substrate having first and second opposing planar surfaces oriented transverse to advancing magnetic tape;
   b) said first series of inductive record heads being of the thin film type and said first series of playback heads being of the magnetoresistive type, with both said first series of record heads and said first series of playback heads being situated in proximity to said first planar surface of said substrate, one overlaying the other, with corresponding heads in each series in alignment with each other;
   c) said second series of indutive record heads being of the tin film type and said second series of playback heads being of the magnetoresistive type, with both said second series of record heads and said second series of playback heads being in proximity to said second planar surface on said substrate, one overlying the other, with heads in each series in alignment with each other and in alignment with corresponding heads located on said first planar surface;

d) said unitary substrate being sufficiently thick to isolate (1) said second series of magnetoresistive playback heads from the effects of fields created by said first series of inductive record heads, and (2) said first series of magnetoresistive playback heads from the effects of fringing fields created by said second series of inductive record heads.

7. A composite bi-directional read-while-write magnetic head assembly comprising:
   a) first and second substrates having, respectively, first and second opposing planar surfaces;
   b) an inductive record head of the thin film type situated in proximity to said first planar surface of said first substrate, and an inductive record head of the thin film type situated in proximity to said first planar surface of said second substrate;
   c) a playback head of the magnetoresistive type situated in proximity to said second planar surface of said first substrate in alignment with said record head deposited in proximity to said first planar surface of said first substrate, and a playback head of the magnetoresistive type situated in proximity to said second planar surface of said second substrate in alignment with said record head deposited in proximity to said first planar surface of said second substrate; and
   d) adhesive means for coupling said first and said second substrates with corresponding heads in alignment with each other and with one of said substrates disposed between said magnetoresistive playback head situated in proximity to said second substrate and said inductive record head situated in proximity to said first substrate and with the other of said substrates disposed between said magnetoresistive playback head situated in proximity to said first substrate and said inductive record head situated in proximity to said second substrate;
   e) said first substrate and said second substrate being sufficiently thick to isolate (1) said magnetoresistive playback head situated in proximity to said second substrate from the effects of fields created by said inductive record head situated in proximity to said first substrate, and (2) said magnetoresistive playback head situated in proximity to said first substrate from the effects of fields created by said inductive head situated in proximity to said second substrate.

8. A composite bi-directional read-while-write magnetic head assembly comprising:
   a) first and second substrates having, respectively, first and second opposing planar surfaces;
   b) a first inductive record head of the thin film type and a first playback head of the magnetoresistive type deposited in proximity to said first planar surface of said first substrate, one overlaying the other and both in alignment with each other;
   c) a second inductive record head of the thin film type and a second playback head of the magnetoresistive type deposited on said first planar surface of said second substrate in alignment with each other;
   d) adhesive means for joining said first substrate and said second substrate together at a common interface defined by said second planar surface of both substrates with corresponding heads located on each substrate in alignment with each other; and
   e) said first substrate and said second substrate having a cumulative thickness sufficient to isolate (1) said magnetoresistive playback head situated in proximity to said second substrate from the effects of fields created by said inductive record head situated in proximity to said first substrate, and (2) said magnetoresistive playback head situated in proximity to said first substrate from the effects of fields created by said inductive head situated in proximity to said second substrate.

* * * * *

UNITED STATES PATENT AND TRADEMARK OFFICE
CERTIFICATE OF CORRECTION

PATENT NO. : 5,218,498
DATED : June 8, 1993
INVENTOR(S) : Tomasz M. Jagielinski

It is certified that error appears in the above-indentified patent and that said Letters Patent is hereby corrected as shown below:

| | |
|---|---|
| Col. 7, line 8 | "econd" should read --second--. |
| Col. 8, line 18 | "srecord" should read --record--. |
| Col. 8, line 60 | "indutive" should read --inductive--. |
| Col. 8, line 61 | "tin" should read --thin--. |
| Col. 8, line 65-66 | "overlying" should read --overlaying--. |

Signed and Sealed this

Twenty-ninth Day of March, 1994

BRUCE LEHMAN

Attest:

Attesting Officer

Commissioner of Patents and Trademarks